(12) United States Patent
Osada et al.

(10) Patent No.: US 9,539,980 B2
(45) Date of Patent: Jan. 10, 2017

(54) SEAT BELT RETRACTOR AND SEAT BELT DEVICE USING THE SAME

(75) Inventors: Kenji Osada, Tokyo (JP); Hirokazu Yoshioka, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 210 days.

(21) Appl. No.: 13/424,210

(22) Filed: Mar. 19, 2012

(65) Prior Publication Data

US 2012/0303219 A1 Nov. 29, 2012

(30) Foreign Application Priority Data

May 25, 2011 (JP) ................................. 2011-117185

(51) Int. Cl.
*B60R 22/41* (2006.01)
*B60R 22/405* (2006.01)
*B60R 22/34* (2006.01)

(52) U.S. Cl.
CPC ............. *B60R 22/41* (2013.01); *B60R 22/405* (2013.01); *B60R 2022/3419* (2013.01)

(58) Field of Classification Search
CPC .. B60R 22/185; B60R 22/1951; B60R 22/195; B60R 22/34; B60R 22/3416; B60R 22/38; B60R 22/40; B60R 22/385; B60R 22/401; B60R 22/4825; B60R 22/485
See application file for complete search history.

(56) References Cited

U.S. PATENT DOCUMENTS

| | | | |
|---|---|---|---|
| 4,749,142 A * | 6/1988 | Saitow | 242/382.2 |
| 5,826,813 A | 10/1998 | Hibata | |
| 7,090,304 B2 | 8/2006 | Delventhal et al. | |
| 7,637,536 B2 | 12/2009 | Delventhal et al. | |
| 2009/0057470 A1 | 3/2009 | Hiramatsu et al. | |
| 2009/0057471 A1 | 3/2009 | Hiramatsu et al. | |
| 2010/0123348 A1* | 5/2010 | Hiramatsu et al. | 297/476 |
| 2011/0073699 A1 | 3/2011 | Kröger et al. | |
| 2011/0089282 A1* | 4/2011 | Guillem | 242/383.1 |
| 2011/0163194 A1 | 7/2011 | Aranda et al. | |
| 2012/0303219 A1 | 11/2012 | Osada et al. | |

FOREIGN PATENT DOCUMENTS

| | | |
|---|---|---|
| CN | 101380933 A | 3/2009 |
| CN | 101380993 A | 3/2009 |

(Continued)

OTHER PUBLICATIONS

European Search Report EP Application No. 12160196.7 dated Sep. 4, 2012.

(Continued)

*Primary Examiner* — Basil T Jos
(74) *Attorney, Agent, or Firm* — Foley & Lardner LLP

(57) ABSTRACT

A seat belt retractor that functions to cancel both a function of a vehicle sensor and a function of a webbing sensor on a predetermined condition with a simple structure and a small number of components. When a seat belt is fully retracted, a cam follower of a first lever comes into contact with a second cam portion of a cam plate. An actuator pressing portion of the first lever presses an actuator of a vehicle sensor to a non-operation position. The function of the vehicle sensor is thereby cancelled. Further, when an engaging claw of a second lever separates from a ratchet tooth of a ring gear, the ring gear is allowed to rotate in a seat belt withdrawing direction. Therefore, the function of the webbing sensor is cancelled.

8 Claims, 9 Drawing Sheets

(56) References Cited

FOREIGN PATENT DOCUMENTS

| CN | 101472773 A | 7/2009 |
|---|---|---|
| EP | 1 394 004 A1 | 3/2004 |
| EP | 2 527 212 A1 | 11/2012 |
| JP | 09-309408 | 12/1997 |
| JP | 2004-090672 | 3/2004 |
| JP | 2006-224954 | 8/2006 |
| JP | 3947064 | 7/2007 |
| JP | 2008-049939 A | 3/2008 |
| JP | 2009-061810 | 3/2009 |
| JP | 2009-132317 | 6/2009 |
| JP | 2010-179863 | 8/2010 |
| JP | 2011-520705 | 7/2011 |
| JP | 2012-192854 | 10/2012 |
| WO | WO 2008/064870 A1 | 6/2008 |
| WO | WO-2009/143984 A1 | 12/2009 |
| WO | WO 2010/046053 A1 | 4/2010 |
| WO | WO 2010/051949 A1 | 5/2010 |
| WO | WO-2012/039088 A1 | 3/2012 |
| WO | WO-2013/133071 A1 | 9/2013 |

OTHER PUBLICATIONS

International Search Report dated Jan. 14, 2014 issued in connection with PCT/JP2013/077429.
European Search Report for EP Patent Application No. 13857483.5 mailed Mar. 30, 2016.
Notice of Rejection for Japanese Patent Application No. 2012-254088 mailed Apr. 13, 2016.

\* cited by examiner

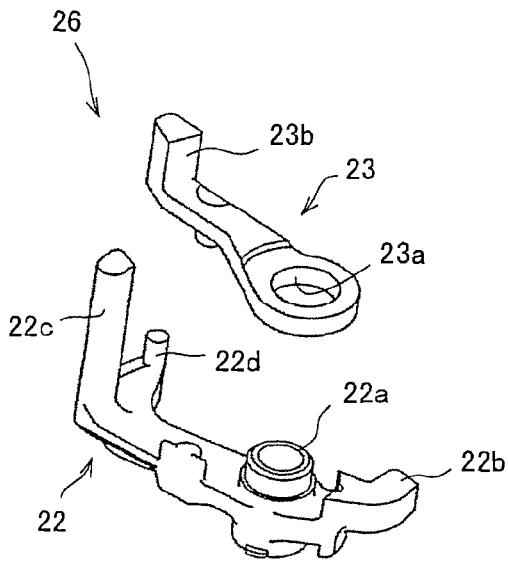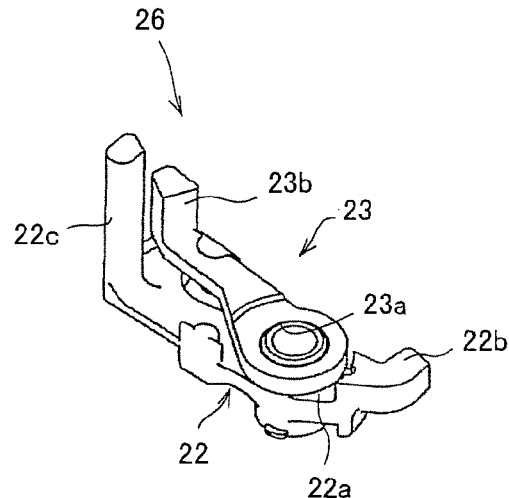
FIG. 4(a)　　　　FIG. 4(b)
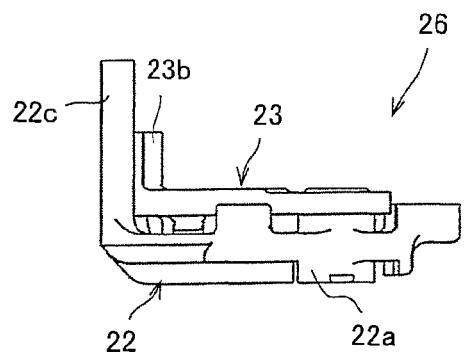
FIG. 4(d)
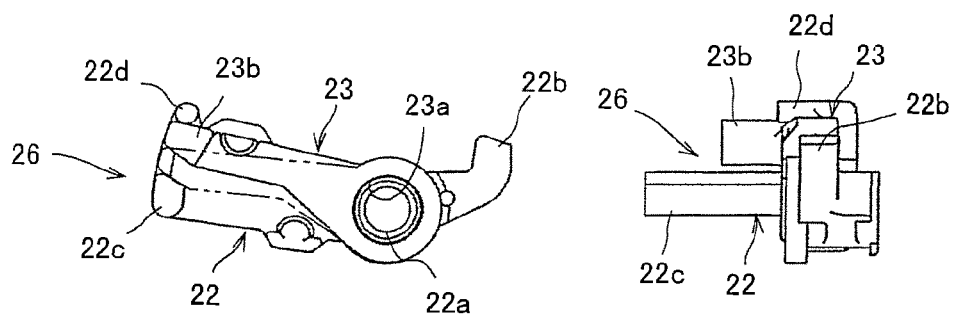
FIG. 4(c)　　　　FIG. 4(e)

SEAT BELT RETRACTOR AND SEAT BELT DEVICE USING THE SAME

BACKGROUND

The present invention relates to a technical field of a seat belt retractor mounted in a vehicle, such as an automobile, to retract webbing serving as a seat belt by a spool and a seat belt device that restrains an occupant with the seat belt withdrawn from the seat belt retractor. More particularly, the present invention relates to a technical field of a seat belt retractor including at least a vehicle sensor that inhibits withdrawal of a seat belt in case of an emergency, such as a vehicle collision when a deceleration much higher than a deceleration, which is produced during normal running, acts on a vehicle (hereinafter simply referred to as an emergency) and a webbing sensor that inhibits withdrawal of the seat belt when the seat belt is rapidly withdrawn at a speed higher than a normal seat belt withdrawing speed for wearing the seat belt (that is, an acceleration higher than a normal withdrawing acceleration for wearing the seat belt), and a seat belt device using the seat belt retractor.

A conventional seat belt device mounted on a vehicle seat of an automobile and the like restrains an occupant with a seat belt formed by webbing in case of an emergency. In general, such a seat belt device includes a seat belt retractor. Most conventional seat belt retractors include a vehicle sensor that operates to inhibit withdrawal of the seat belt in case of an emergency, and a webbing sensor that swings to inhibit withdrawal of the seat belt in response to the above-described rapid withdrawal of the seat belt (hereinafter referred to as rapid seat belt withdrawal).

For example, in a seat belt device which is mounted on a vehicle seat with no occupant sitting and in which a seat belt is not worn, a vehicle sensor is sometimes actuated by vibration during vehicle running. However, it is sometimes desired that, except when the occupant wears the seat belt, the vehicle sensor should not be actuated and the original function of the vehicle sensor for operating to inhibit withdrawal of the seat belt in case of an emergency should be cancelled (disabled). Accordingly, a seat belt retractor has been proposed in which the above-described original function of the vehicle sensor is performed when the occupant wears the seat belt and in which the original function of the vehicle sensor is cancelled (disabled) on a predetermined condition except when the occupant wears the seat belt (for example, see PTL 1 (U.S. Pat. No. 7,090,304), incorporated by reference herein).

The seat belt retractor described in PTL 1 includes a ring gear that corotates with a spool gear, and a control lever. Since the ring gear does not operate the control lever in a state in which the seat belt is withdrawn from the seat belt retractor by a predetermined length, the control lever allows a vehicle sensor to operate and perform its original function. Further, since the ring gear, which rotates with rotation of the spool in a seat belt retracting direction, operates the control lever, the control lever inhibits operation of the vehicle sensor and cancels the original function of the vehicle sensor in a state in which the spool at least fully retracts the seat belt.

In contrast, the webbing sensor sometimes operates to inhibit withdrawal of the seat belt from the seat belt retractor except during rapid seat belt withdrawal. For example, in a case in which the webbing sensor suddenly operates during full retraction of the withdrawn seat belt, a so-called end-lock sometimes occurs, that is, normal withdrawal of the seat belt becomes difficult.

Accordingly, to prevent such an end-lock due to the webbing sensor, a seat belt retractor has been proposed which cancels (disables) the original function of the webbing sensor for operating to inhibit withdrawal of the seat belt during full retraction of the seat belt (for example, see PTL 2 (Japanese Patent No. 3947064), incorporated by reference herein).

The seat belt retractor described in PTL 2 includes an inertia plate that swings in case of rapid seat belt withdrawal, a rotatable webbing sensor gear including internal teeth and external teeth, a webbing sensor pawl that is operated by swing of the inertia plate so as to engage with an internal tooth of the webbing sensor gear, and a gear rotation control pawl that engages with an external tooth of the webbing sensor gear to inhibit rotation of the webbing sensor gear.

In the seat belt retractor described in PTL 2, in a state in which the seat belt is withdrawn from the seat belt retractor by a predetermined length, the gear rotation control pawl engages with the external tooth of the webbing sensor gear to disable rotation of the webbing sensor gear. Thus, when the webbing sensor pawl is operated by swing of the inertia plate and engages with the internal tooth of the webbing sensor gear, the webbing sensor gear does not rotate. Hence, the original function of the webbing sensor is performed, and withdrawal of the seat belt is inhibited. Further, in a state in which the spool substantially fully retracts the seat belt, the gear rotation control pawl separates from the external tooth of the webbing sensor gear to allow rotation of the webbing sensor gear. Thus, even when the webbing sensor pawl is operated by swing of the inertia plate and engages with the internal tooth of the webbing sensor gear, the webbing sensor gear rotates and the spool is allowed to rotate in the seat belt withdrawing direction. Hence, the original function of the webbing sensor is cancelled. Therefore, withdrawal of the seat belt is enabled, and an end-lock is prevented. The seat belt retractor described in PTL 2 also includes a vehicle sensor.

SUMMARY

The seat belt retractor described in PTL 1 does not include a webbing sensor. Not only the function of the webbing sensor cannot be performed, but also the function of the webbing sensor cannot be cancelled on a predetermined condition. In contrast, the seat belt retractor described in PTL 2 includes the vehicle sensor in addition to the webbing sensor. However, the function of the vehicle sensor cannot be cancelled on a predetermined condition. Therefore, it is conceivable to cancel both the function of the vehicle sensor and the function of the webbing sensor on a predetermined condition by combining the cancelling function of the vehicle sensor of PTL 1 and the cancelling function of the webbing sensor of PTL 2. However, when the cancelling function of the vehicle sensor of PTL 1 and the cancelling function of the webbing sensor of PTL 2 are simply combined, the structures of the sensors and the cancelling structures of the sensors are complicated, and the number of components is increased.

The present invention has been made in view of these circumstances, and an object of the invention is to provide a seat belt retractor that can cancel both a function of a vehicle sensor and a function of a webbing sensor on a predetermined condition with a simple structure and a smaller number of components, and a seat belt device using the seat belt retractor.

To solve the above-described problems, a seat belt retractor according to the present invention includes at least a spool that retracts a seat belt for restraining an occupant. The seat belt retractor includes a vehicle sensor having a function of operating to inhibit rotation of the spool in a seat belt withdrawing direction in case of an emergency when a deceleration higher than a normal deceleration is applied to a vehicle, a webbing sensor having a function of operating to inhibit rotation of the spool in the seat belt withdrawing direction when the seat belt is rapidly withdrawn at a speed higher than a normal withdrawing speed, and a vehicle-sensor-function and webbing-sensor-function cancel control mechanism that controls cancellation of the function of the vehicle sensor and the function of the webbing sensor.

In the seat belt retractor according to the present invention, the vehicle-sensor-function and webbing-sensor-function cancel control mechanism controls the vehicle sensor and the webbing sensor so that the function of the vehicle sensor and the function of the webbing sensor are cancelled when the spool at least fully retracts the seat belt.

In the seat belt retractor according to the present invention, the vehicle-sensor-function and webbing-sensor-function cancel control mechanism includes a vehicle-sensor-function and webbing-sensor-function cancel control member that controls cancellation of the function of the vehicle sensor and the function of the webbing sensor, and a control cam member that rotates with rotation of the spool to control operation of the vehicle-sensor-function and webbing-sensor-function cancel control member.

Further, in the seat belt retractor according to the present invention, the vehicle-sensor-function and webbing-sensor-function cancel control member is a control lever whose operation is controlled by the control cam member.

Further, in the seat belt retractor according to the present invention, the control lever includes a first lever that cancels the function of the vehicle sensor, and a second lever that is connected to the first lever to be movable relative to the first lever and that cancels the function of the webbing sensor.

Further, a seat belt device according to the present invention includes at least a seat belt that restrains an occupant, a seat belt retractor that withdrawably retracts the seat belt and that operates to inhibit withdrawal of the seat belt in case of an emergency, a tongue slidably supported by the seat belt withdrawn from the seat belt retractor, and a buckle provided in a vehicle body or a vehicle seat to detachably catch the tongue. The seat belt retractor adopts any one of the above-described seat belt retractors of the present invention.

According to the seat belt retractor of the present invention having the above structure, both the function of the vehicle sensor and the function of the webbing sensor can be performed. Further, the vehicle-sensor-function and webbing-sensor-function cancel control mechanism controls cancellation of both the function of the vehicle sensor and the function of the webbing sensor. Therefore, cancellation of both the function of the vehicle sensor and the function of the webbing sensor can be easily controlled with a simple structure using the single vehicle-sensor-function and webbing-sensor-function cancel control mechanism.

In particular, when the spool at least fully retracts the seat belt, both the function of the vehicle sensor and the function of the webbing sensor are cancelled. By such cancellation of the function of the vehicle sensor, the vehicle sensor can be disabled to operate. This can prevent abnormal noise from occurring from the vehicle sensor in the seat belt retractor that is not used during vehicle running. Further, by the above-described cancellation of the function of the webbing sensor, the webbing sensor can be disabled to operate. This can prevent an end-lock from being caused by sudden operation of the webbing sensor when the seat belt is at least fully retracted by the spool.

Since the constituents used in the conventional seat belt retractor can be used in the vehicle-sensor-function and webbing-sensor-function cancel control mechanism, the vehicle-sensor-function and webbing-sensor-function cancel control mechanism can be formed without any need for any great design change, and the increase in the number of components can be suppressed. As a result, even when cancellation of the function of the vehicle sensor and the function of the webbing sensor can be controlled, the seat belt retractor can be made compact.

In this way, according to the seat belt retractor of the present invention, it is possible to perform the function of the vehicle sensor and the function of the webbing sensor and to cancel the functions on a predetermined condition with a simple structure and a small number of components.

On the other hand, according to the seat belt device of the present invention, since the occurrence of abnormal noise and the occurrence of an end-lock in the seat belt retractor can be more effectively prevented, operability of the seat belt is enhanced, the occupant can smoothly and stably wears the seat belt, and comfort during vehicle running can be improved.

BRIEF DESCRIPTION OF THE DRAWINGS

FIG. 4 illustrates a vehicle-sensor-function and webbing-sensor-function cancel control member in the seat belt retractor of the embodiment, FIG. 4(a) is an exploded perspective view, FIG. 4(b) is an assembly perspective view, FIG. 4(c) is a front view, FIG. 4(d) is a top view, and FIG. 4(e) is a right side view.

DETAILED DESCRIPTION

An embodiment of the present invention will be described below with reference to the drawings.

Figure 1:
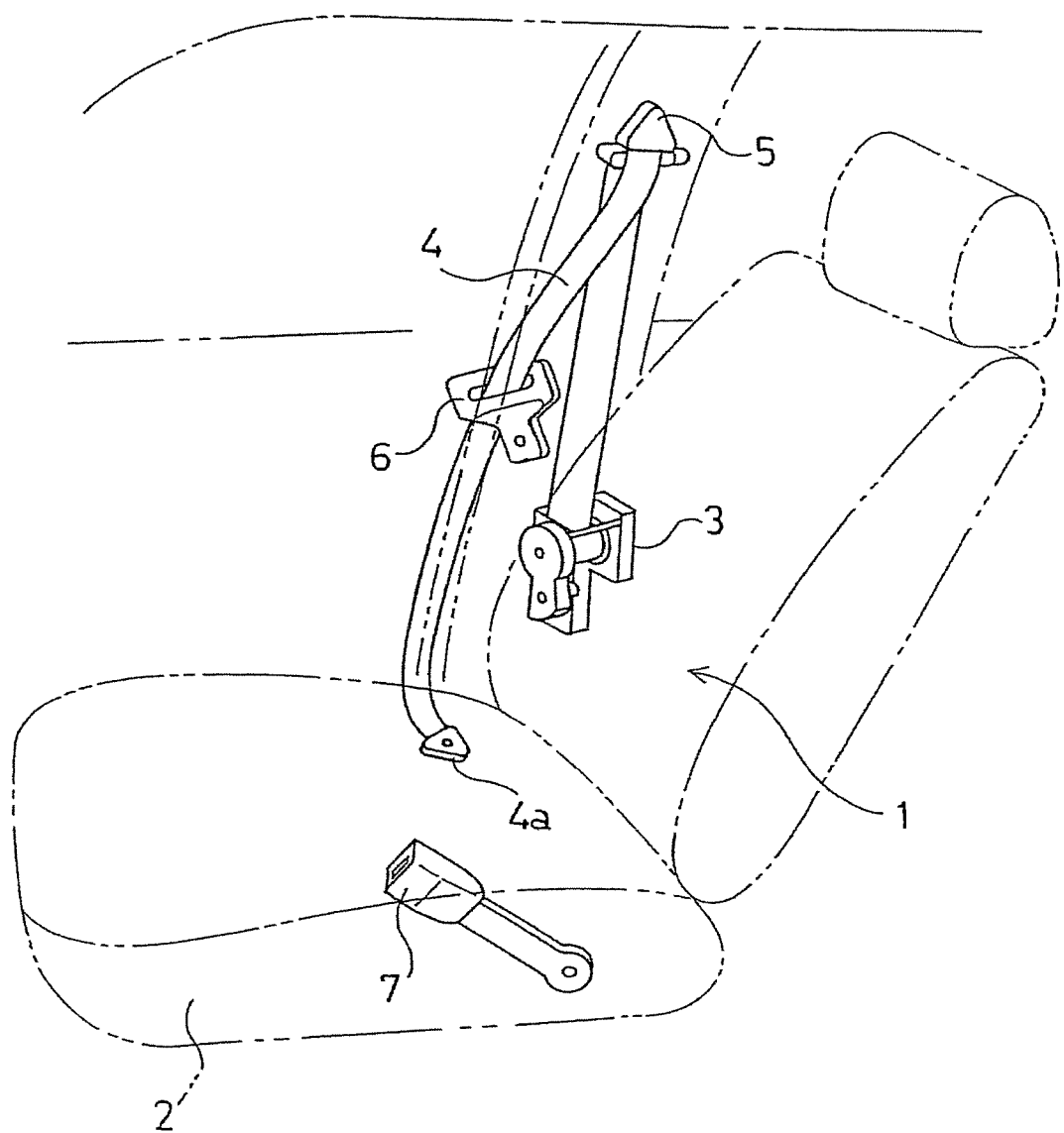
FIG. 1 is a schematic perspective view of a seat belt device including a seat belt retractor according to an embodiment of the present invention.

FIG. 1 is a schematic view of a seat belt device including a seat belt retractor according to an embodiment of the present invention.

As illustrated in FIG. 1, a seat belt device 1 of this embodiment is basically the same as known three-point type seat belt devices. In the figure, reference numeral 1 denotes a seat belt device, reference numeral 2 denotes a vehicle seat, reference numeral 3 denotes a seat belt retractor provided near the vehicle seat 2, and reference numeral 4 denotes a seat belt that can be withdrawably retracted by the seat belt retractor 3 and that has at its tip a belt anchor 4a fixed to the floor of the vehicle body or the vehicle seat 2. Reference numeral 5 denotes a guide anchor that guides the seat belt 4 withdrawn from the seat belt retractor 3 toward the shoulder of an occupant, reference numeral 6 denotes a tongue slidably supported by the seat belt 4 guided from the guide anchor 5, and reference numeral 7 denotes a buckle fixed to the floor of the vehicle body or the vehicle seat in a manner such that the tongue 6 is engageably and disengageably inserted in and engaged with the buckle 7. Operations of fastening and unfastening the seat belt 4 in the seat belt device 1 are identical to those adopted in known seat belt devices.

Figure 2:
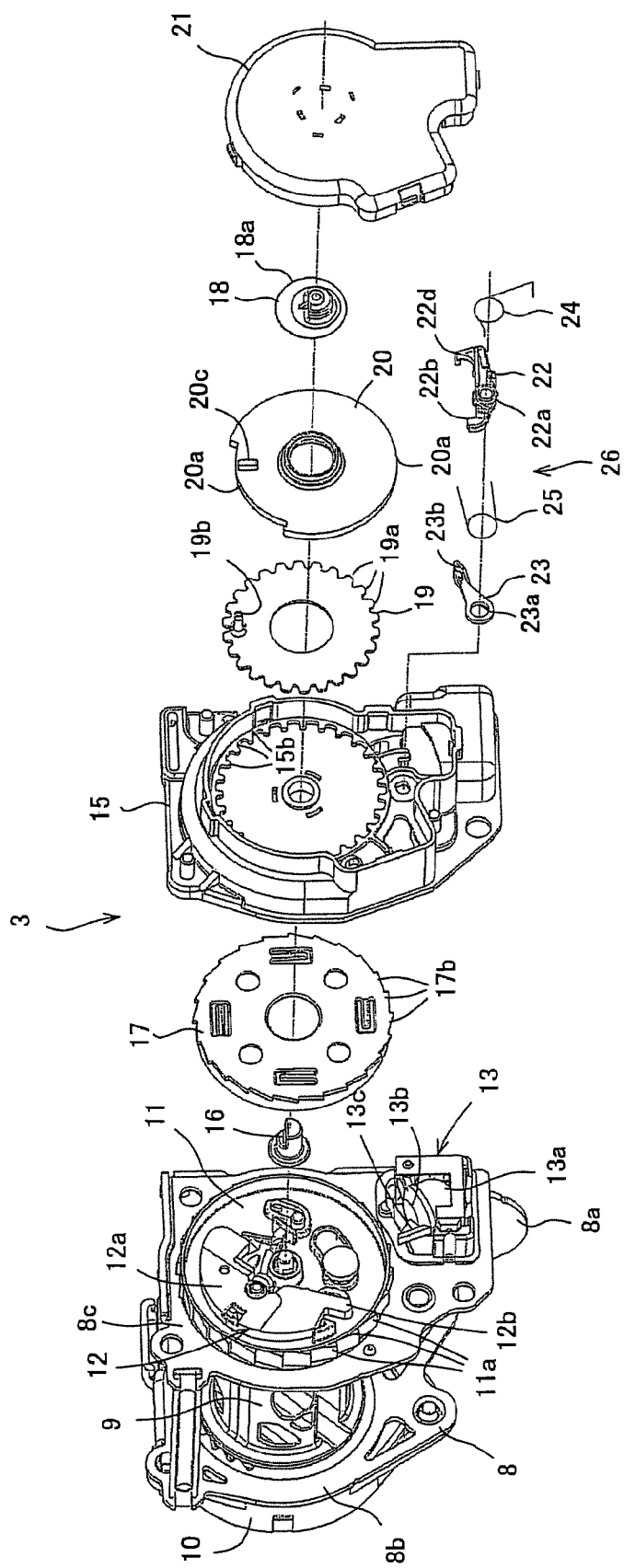
FIG. 2 is an exploded perspective view of the seat belt retractor of the embodiment.
Figure 3:
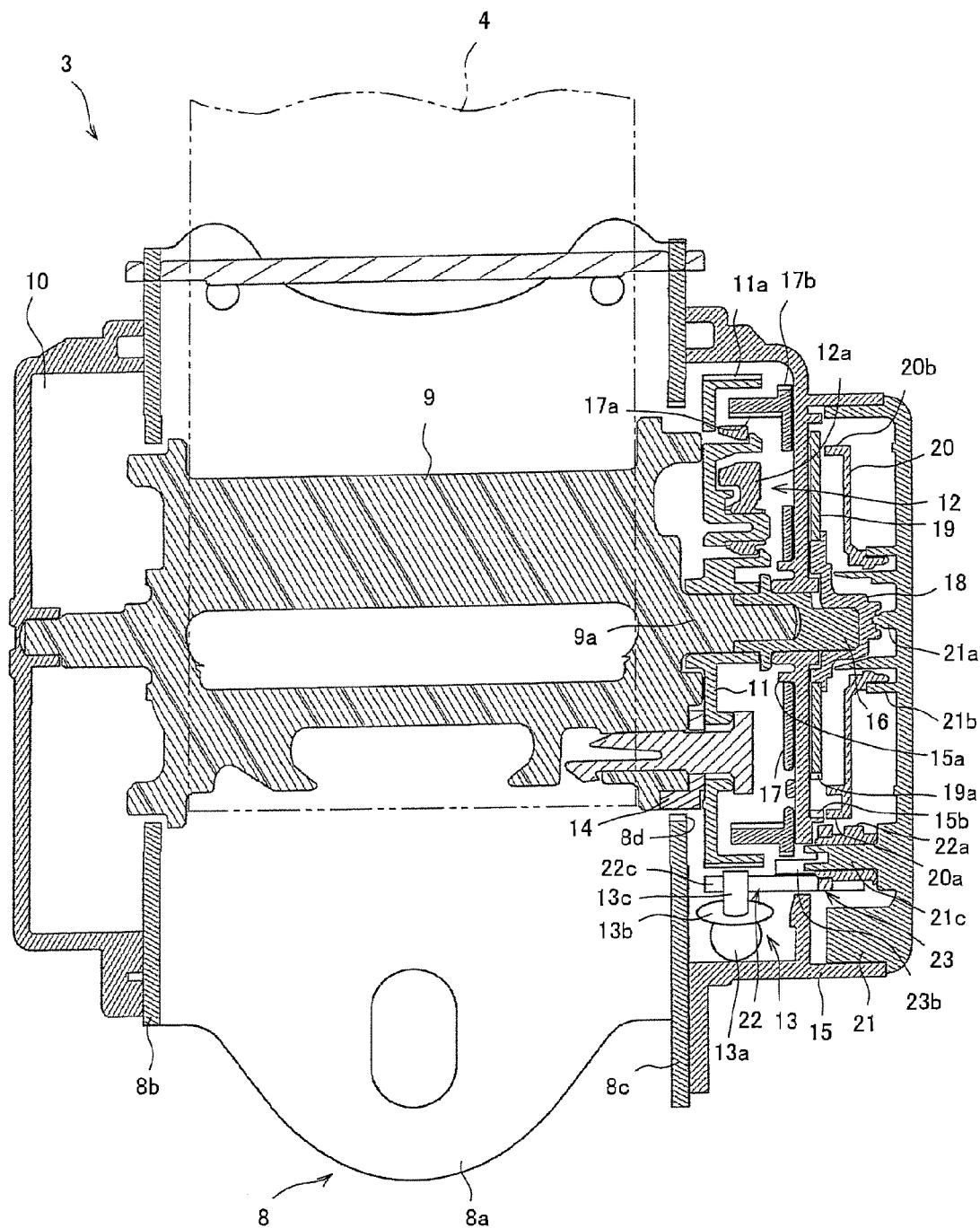
FIG. 3 is a longitudinal sectional view of the seat belt retractor of the embodiment.

FIG. 2 is an exploded perspective view of the seat belt retractor of the embodiment, and FIG. 3 is a longitudinal sectional view of the seat belt retractor of the embodiment.

Similarly to known typical seat belt retractors, as illustrated in FIGS. 2 and 3, the seat belt retractor 3 of the embodiment includes: an angular U-shaped frame 8 formed by a back plate 8a and left and right side walls 8b and 8c; a spool 9 extending through circular apertures of both the side walls 8b and 8c of the frame 8 and rotatably provided to retract the seat belt 4; a spring mechanism 10 that constantly biases the spool 9 in a seat belt retracting direction; a lock gear 11 having a predetermined number of ratchet teeth 11a on its outer periphery and concentrically fitted and supported on a rotation shaft 9a of the spool 9 so as to corotate with the rotation shaft 9a when its rotation is not inhibited and to allow relative rotation of the rotation shaft 9a when its rotation is inhibited; a webbing sensor 12 including a flywheel 12a serving as an inertia member swingably supported by the lock gear 11 and an engaging claw 12b; a vehicle sensor 13 (deceleration detection mechanism) including an inertia ball 13a that does normally not operate but operates in case of an emergency, an actuator 13b to be operated by the operation of the inertia ball 13a, and an engaging claw 13c that operates and engages with a ratchet tooth 11a of the lock gear 11 in response to the operation of the actuator 13b so as to inhibit rotation of the lock gear 11 in a seat belt withdrawing direction; and a pawl 14 that is turnably provided in the spool 9 and that turns into engagement with an internal tooth 8d of the side wall 8c to inhibit rotation of the spool 9 in the seat belt withdrawing direction when the spool 9 rotates relative to the lock gear 11 in the seat belt withdrawing direction. In this case, the internal tooth 8d of the side wall 8c and the pawl 14 constitute a lock mechanism that locks rotation of the spool 9 in the seat belt withdrawing direction, and the lock gear 11 forms a lock operation control mechanism that controls operation of the lock mechanism. The above-described structures and operations of the seat belt retractor 3 are the same as those described, for example, in Japanese Unexamined Patent Application Publication No. 2009-61810, and can be easily understood by reference to the publication. Therefore, detailed descriptions thereof are skipped.

The seat belt retractor 3 of the embodiment further includes a retainer 15, a bearing cap 16, a ring gear 17, an eccentric disc 18, an eccentric gear 19, a cam plate 20, a cover 21, a first lever 22, a second lever 23, a first-lever bias spring 24, and a second-lever bias spring 25.

The retainer 15 is removably attached to the right side wall 8c of the frame 8. The retainer 15 has a cylindrical support projection 15a, and a predetermined number of internal teeth 15b arranged in an annular form. The bearing cap 16 is corotatably fitted on an end of the rotation shaft 9a of the spool 9, and is rotatably supported by the retainer 15. That is, the rotation shaft 9a of the spool 9 is rotatably supported by the retainer 15. The ring gear 17 is rotatably supported by the support projection 15a of the retainer 15. The ring gear 17 has internal teeth 17a arranged in an annular form, and ratchet teeth 17b serving as external teeth arranged in an annular form on an outer peripheral surface thereof. The engaging claw 12b of the flywheel 12a is engageable with the internal teeth 17a arranged in an annular form. When the engaging claw 12b engages with an inner tooth 17a of the ring gear 17 whose rotation is inhibited, rotation of the lock gear 11 is inhibited.

The eccentric disc 18 is corotatably fitted on an end of the bearing cap 16, and is rotatably supported by a support projection 21a of the cover 21 that is removably attached to the retainer 15. Therefore, the eccentric disc 18 is corotatable with the spool 9. The eccentric gear 19 is shaped like a disk, and is fitted on and supported by an outer peripheral surface 18a of the eccentric disc 18 such as to rotate relative to the eccentric disc 18. When the eccentric disc 18 (that is, the spool 9) rotates, the eccentric gear 19 rotates while the center thereof moves in the radial direction from the rotation center of the eccentric disc 18 (that is, the rotation center of the spool 9) (eccentrically rotates). The eccentric gear 19 has external teeth 19a arranged in an annular form on an outer peripheral surface thereof. In this case, some of the external teeth 19a of the eccentric gear 19 mesh with some of the internal teeth 15b of the retainer 15, and the remaining external teeth 19a of the eccentric gear 19 separate from the remaining internal teeth 15h of the retainer 15. When the spool 9 rotates and the eccentric gear 19 eccentrically rotates, combinations of the external teeth 19a of the eccentric gear 19 and the internal teeth 15b of the retainer 15 that are meshed with each other change sequentially. Hence, the eccentric gear 19 is decelerated and rotated in a direction opposite the rotating direction of the spool 9. The eccentric gear 19 further includes a corotation pin 19b standing in a direction orthogonal or substantially orthogonal to a plane of the eccentric gear 19 (that is, a direction orthogonal or substantially orthogonal to the axial direction of the spool 9).

The cam plate 20 is rotatably fitted and supported in an inner peripheral surface of the cylindrical support projection 21b of the cover 21. The cam plate 20 has an outer peripheral surface provided with a cam profile. The cam profile of the outer peripheral surface includes a first cam portion 20a shaped like an arc having a large diameter, and a second cam portion 20b shaped like an arc having a small diameter. The first and second cam portions 20a and 20b are formed by concentric arcs. The cam plate 20 also has a rectangular corotation hole 20c extending in a radial direction. The corotation hole 20c is provided in an area corresponding to the second cam portion 20b in a circumferential direction. The corotation pin 19b of the eccentric gear 19 is fitted in the corotation hole 20c of the cam plate 20 in a manner such that the corotation pin 19b is slidable in a longitudinal direction of the corotation hole 20c (that is, the radial direction of the cam plate 20) and is unable to move relative to the corotation hole 20c in the circumferential direction while being engaged with the corotation hole 20c. Thus, when the eccentric gear 19 rotates, the eccentric gear 19 and the cam plate 20 corotate, and the eccentric gear 19 eccentrically moves relative to the cam plate 20 in the radial direction.

As illustrated in FIGS. 2 and 4(a), the first lever 22 has a cylindrical turn shaft 22a, and is turnably supported by a support shaft 21c standing on the cover 21 (see FIG. 3) with the turn shaft 22a being fitted in the support shaft 21c. The first lever 22 includes a cam follower 22b, and an actuator pressing portion 22c and a turn regulating portion 22d provided on a side of the turn shaft 22a opposite the cam follower 22b. The cam follower 22b is in contact with the first and second cam portions 20a and 20b, and moves along cam faces of the first and second cam portions 20a and 20b.

The second lever 23 has a turn shaft hole 23a at one end and an engaging claw 23b at the other end. As illustrated in FIG. 4(b), the turn shaft hole 23a of the second lever 23 is turnably fitted on the turn shaft 22a of the first lever 22. In this case, as illustrated in FIG. 4(c), the engaging claw 23b of the second lever 23 is located between the actuator pressing portion 22c and the turn regulating portion 22d. Thus, as illustrated in FIGS. 4(b) to 4(e), the second lever 23 can turn about the turn shaft hole 23a (that is, turn shaft 22a) relative to the first lever 22 between a position shown by a solid line where the engaging claw 23b is in contact with the turn regulating portion 22d and a position shown by a two-dot chain line where the engaging claw 23b is contact with the actuator pressing portion 22c.

The first-lever bias spring 24 is provided between the first lever 22 and the cover 21, and constantly biases the first lever 22 in a direction such that the cam follower 22b is in contact with the first and second cam portions 20a and 20b. The second-lever bias spring 25 is provided between the first lever 22 and the second lever 23, and constantly biases the second lever 23 in a direction such that the engaging claw 23h is in contact with the turn regulating portion 22d of the first lever 22 (that is, a direction such that the first lever 22 and the second lever 23 are opened relative to each other). Therefore, in a normal state in which external force is not applied to the second lever 23, the engaging claw 23b of the second lever 23 is in contact with the turn regulating portion 22d. The biasing force of the second-lever bias spring 25 is set to be less than the biasing force of the first-lever bias spring 24.

Figure 5:
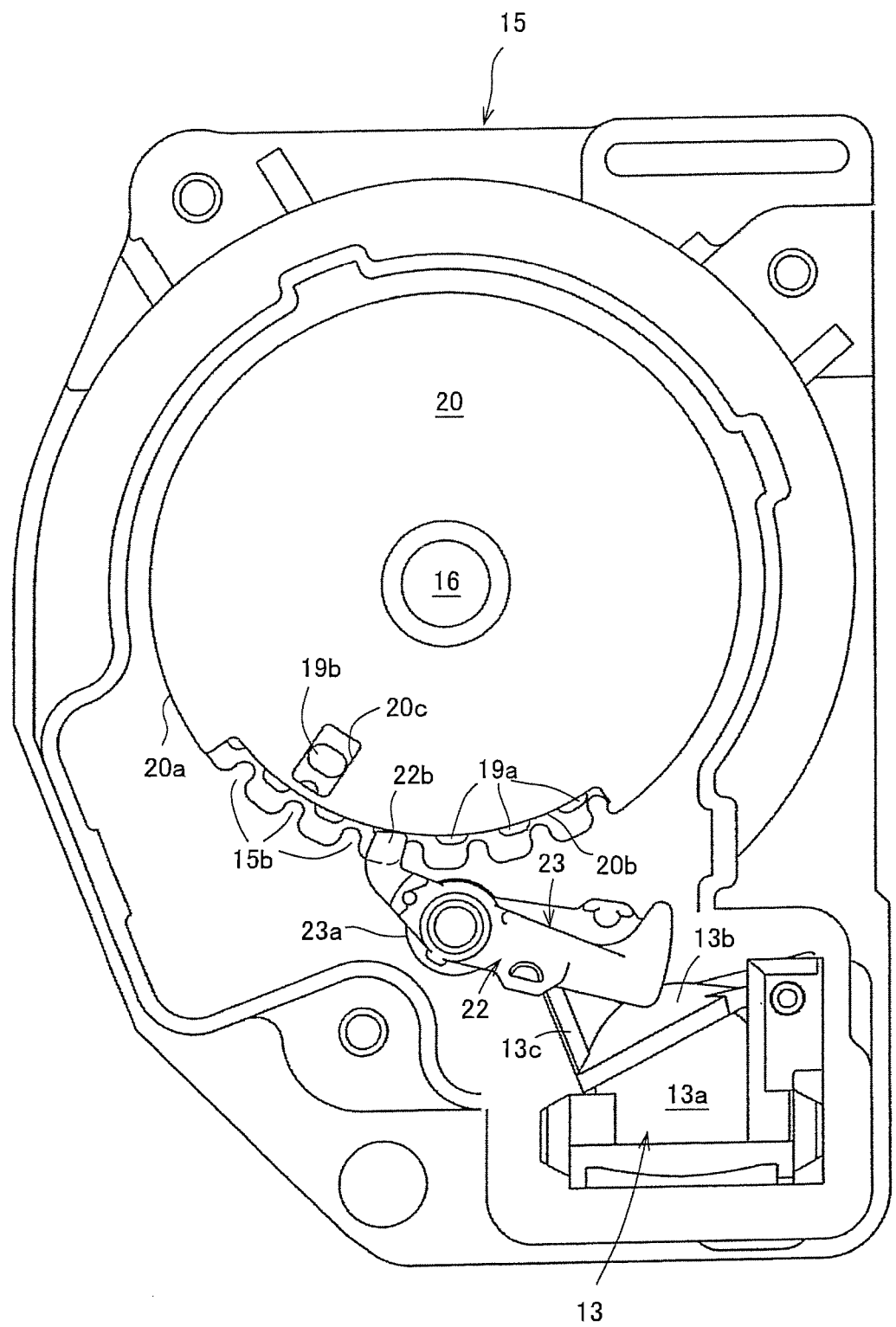
FIG. 5 illustrates a state of a cam plate and a first lever when the seat belt of the embodiment is fully retracted.

Next, operation of the seat belt retractor 3 of the embodiment having such a structure will be described. FIG. 5 illustrates a state of the cam plate and the first lever when the seat belt is fully retracted, and FIG. 6 illustrates a state of the ring gear and the second lever when the seat belt is fully retracted.

As illustrated in FIG. 5, in a state in which the seat belt 4 is not worn and is fully retracted by the spool 9 (more specifically, a state in which the spool 9 retracts the seat belt 4 by the largest possible retracting amount with the biasing force of the spring mechanism 10 without any hindrance), the second cam portion 20b of the cam plate 20 faces downward, and the cam follower 22b is located to oppose the second cam portion 20b. Therefore, the cam follower 22b is made in contact with the second cam portion 20b by the biasing force of the first-lever bias spring 24. Thus, the actuator pressing portion 22c contacts with the actuator 13b of the vehicle sensor 13, and presses the actuator 13b to a non-operation position. As a result, in the seat belt device 1 that is not used by any occupant during vehicle running, the inertia ball 13a of the seat belt retractor 3 does not swing, and abnormal noise does not occur. Further, the engaging claw 13c of the vehicle sensor 13 is retained at a non-operation position out of engagement with the ratchet teeth 11a of the lock gear 11. Therefore, the function of the vehicle sensor 13 is cancelled.

At this time, the eccentric gear 19 moves relative to the cam plate 20 toward a substantially obliquely right upper side in FIG. 5, and is decentered from the center of the cam plate 20 (that is, the center of the spool 9). Therefore, some of the external teeth 19a of the eccentric gear 19 located on the obliquely right upper side mesh with the internal teeth 15b of the retainer 15 (not illustrated). Further, as partially illustrated in FIG. 5, a predetermined number of external teeth 19a of the eccentric gear 19 including the external teeth 19a located on an obliquely left lower side are not meshed with the internal teeth 15b of the retainer 15.

Figure 6:
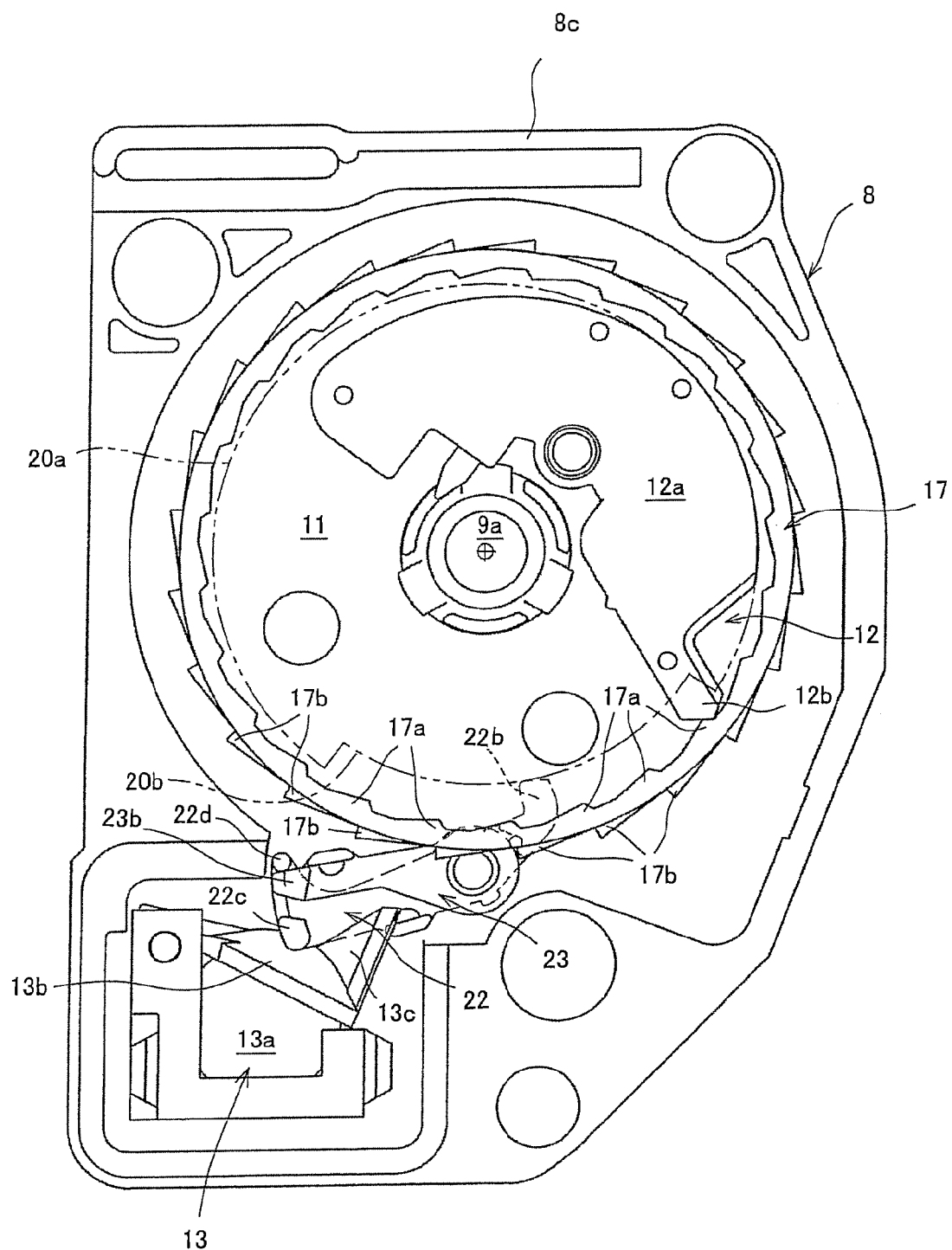
FIG. 6 illustrates a state of a ring gear and a second lever when the seat belt of the embodiment is fully retracted.

Further, as illustrated in FIG. 6, the engaging claw 23b of the second lever 23 is separate from the ratchet teeth 17b of the ring gear 17, and the ring gear 17 is rotatable in both the seat belt withdrawing direction and the seat belt retracting direction. Therefore, the function of the webbing sensor 12 is cancelled. While the engaging claw 12b of the webbing sensor 12 is engaged with the internal tooth 17a of the ring gear 17 in FIG. 6, it may be separate from the internal tooth 17a.

For example, when the occupant withdraws the seat belt 4 at a normal withdrawing speed to wear the seat belt 4 from the state of the seat belt retractor 3 illustrated in FIGS. 5 and 6, the spool 9 rotates counterclockwise in FIG. 5 (clockwise in FIG. 6) against the biasing force of the spring mechanism 10 (the bearing cap 16 that corotates with the spool 9 rotates counterclockwise in FIG. 5, and the rotation shaft 9a of the spool 9 rotates clockwise in FIG. 6). Since the eccentric disc 18 then corotates with the spool 9 in the same direction, the eccentric gear 19 is decelerated by mesh between the external teeth 19a and the internal teeth 15b and rotates in the clockwise direction opposite the rotating direction of the spool 9 while decentering. Since the corotation pin 19b of the eccentric gear 19 is engaged with the corotation hole 20c of the cam plate 20 in the circumferential direction, the cam plate 20 rotates in the same direction as the rotating direction of the eccentric gear 19.

Figure 7:
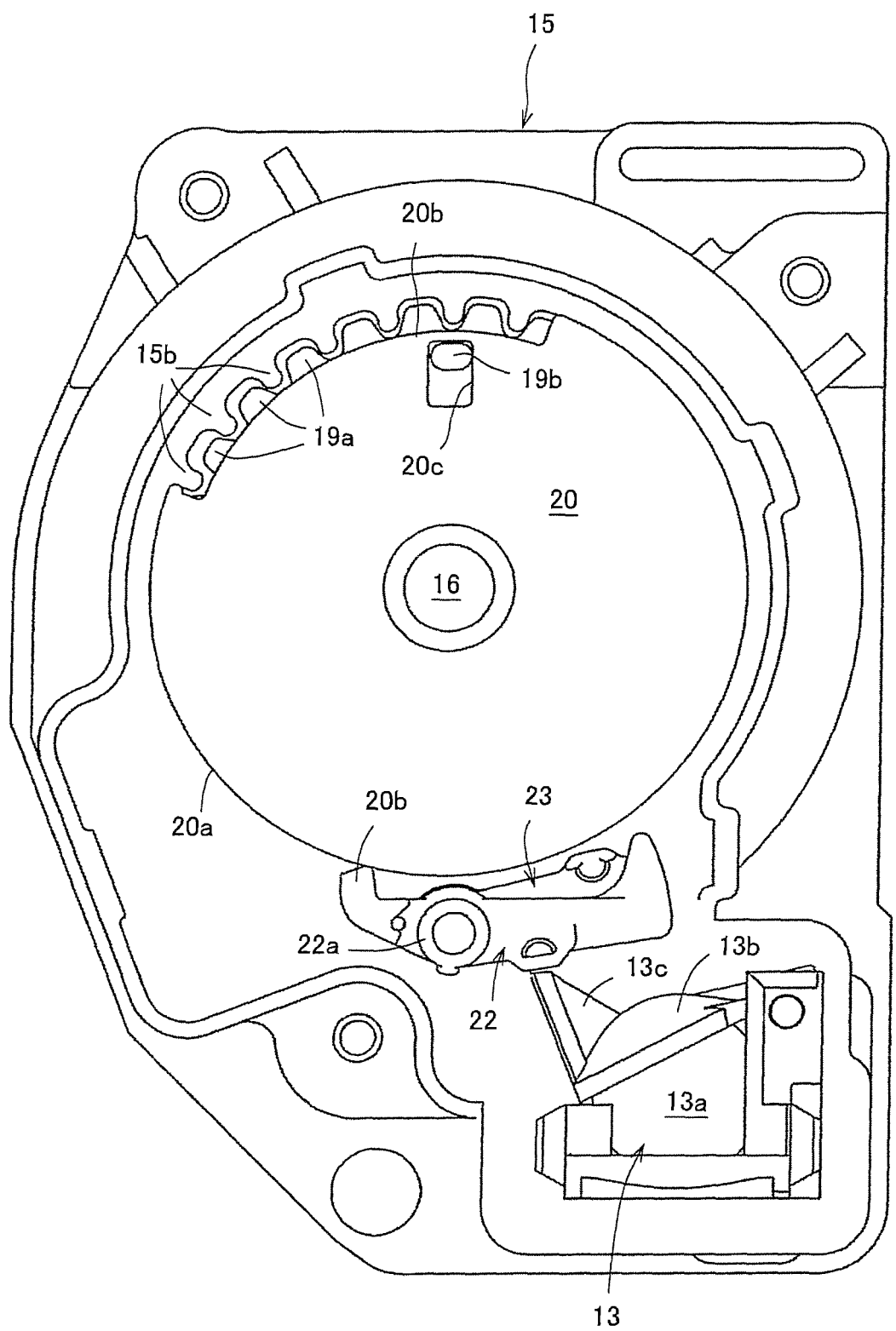
FIG. 7 illustrates a state of the cam plate and the first lever when the seat belt of the embodiment is withdrawn by a predetermined length.

When the cam plate 20 rotates by a predetermined amount, the cam follower 22b comes out of the second cam portion 20b and into contact with the first cam portion 20a, as illustrated in FIG. 7. Thus, the first lever 22 turns counterclockwise in FIG. 5 against the biasing force of the first-lever bias spring 24. At this time, the engaging claw 23b of the second lever 23 is kept in contact with the turn regulating portion 22d of the first lever 22 by the biasing force of the second-lever bias spring 25. Hence, the second lever 23 turns together with the first lever 22 in the same direction.

By this turn of the first lever 22, the actuator pressing portion 22c is separated from the actuator 13b of the vehicle sensor 13. Thus, the actuator 13b of the vehicle sensor 13 becomes operable, cancellation of the function of the vehicle sensor 13 is released (off), and the vehicle sensor 13 is allowed to perform the function. Therefore, in this state, when an emergency occurs during vehicle running while the seat belt 4 is worn by the occupant, the inertia ball 13a of the vehicle sensor 13 inertially moves, and the engaging claw 13c engages with a ratchet tooth 11a of the lock gear 11 in the vehicle sensor 13, in a manner similar to that adopted in the known vehicle sensors. Then, withdrawal of the seat belt 4 is inhibited, and the seat belt 4 can restrain the occupant. Since the seat belt 4 is not withdrawn in the seat belt device 1 mounted on the vehicle seat 2 with no occupant sitting, the seat belt retractor 3 is in a non-operation state illustrated in FIGS. 5 and 6. Therefore, the function of the vehicle sensor 13 is cancelled, and the inertia ball 13a and the actuator 13b are both inhibited from swinging. This prevents abnormal noise from being caused when the inertia ball 13a and the actuator 13b swing during vehicle running.

Figure 8:
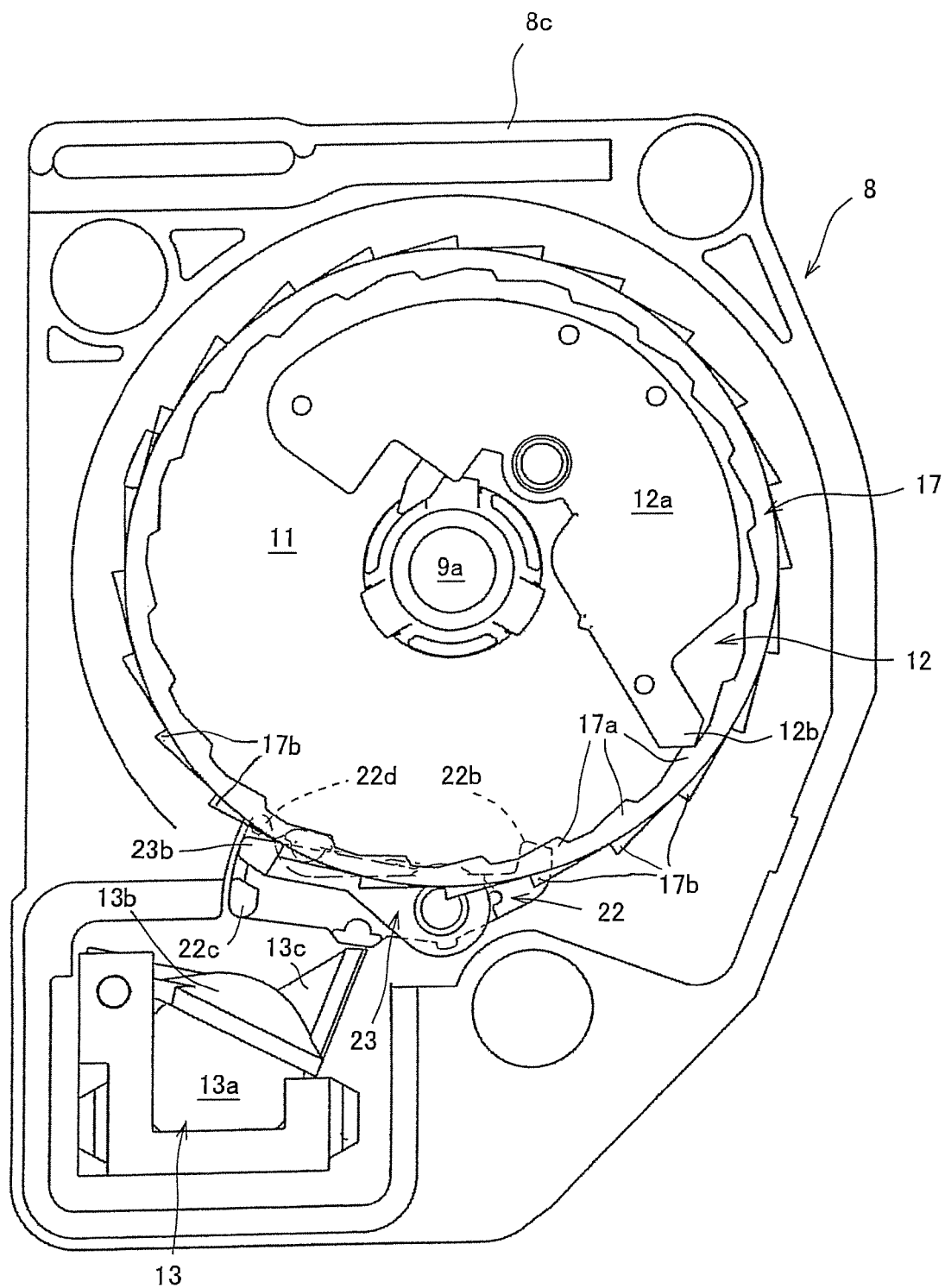
FIG. 8 illustrates a state of the ring gear and the second lever when the seat belt of the embodiment is withdrawn by the predetermined length.

By the turn of the second lever 23, the engaging claw 23b engages with a ratchet tooth 17b of the ring gear 17, as illustrated in FIG. 8. This inhibits rotation of the ring gear 17 in the seat belt withdrawing direction, releases cancellation of the function of the webbing sensor 12, and allows the webbing sensor 12 to perform its function. Therefore, in this state, when the seat belt 4 is rapidly withdrawn at a seat belt withdrawing speed higher than the normal seat belt withdrawing speed, the flywheel 12a swings and the engaging claw 12b engages with the ratchet tooth 17b of the ring gear 17 in the webbing sensor 12, in a manner similar to that adopted in the known webbing sensors. Then, the ring gear 17 is biased by withdrawal of the seat belt 4 to rotate in the seat belt withdrawing direction. However, since the rotation of the ring gear 17 in the seat belt withdrawing direction is inhibited, a rapid withdrawal of the seat belt 4 is prevented.

Figure 9:
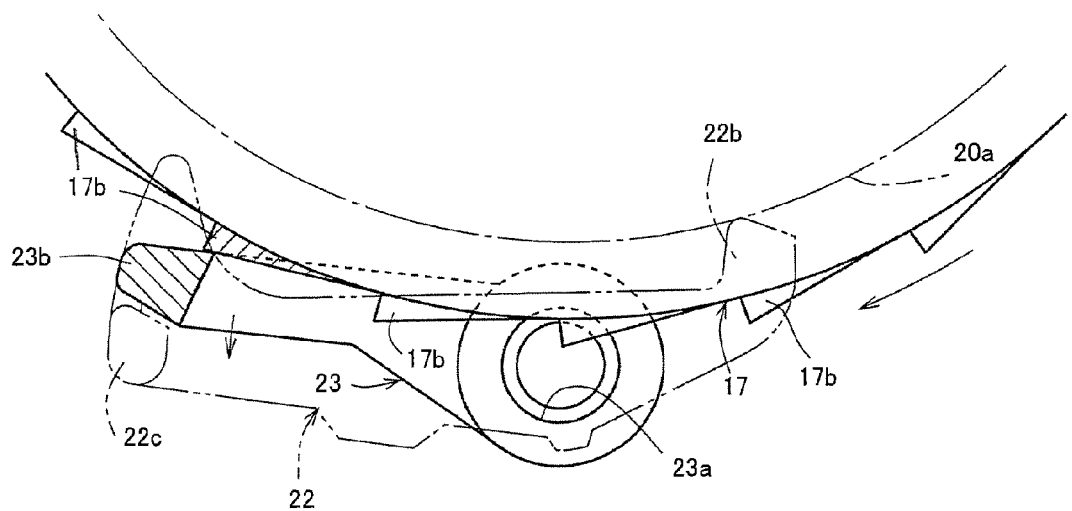
FIG. 9(a) illustrates a contact state between an engaging claw of the second lever and a tip of a ratchet tooth in the ring gear.
FIG. 9(b) illustrates a non-contact state between the engaging claw of the second lever and the tip of the ratchet tooth in the ring gear.
Figure 9:
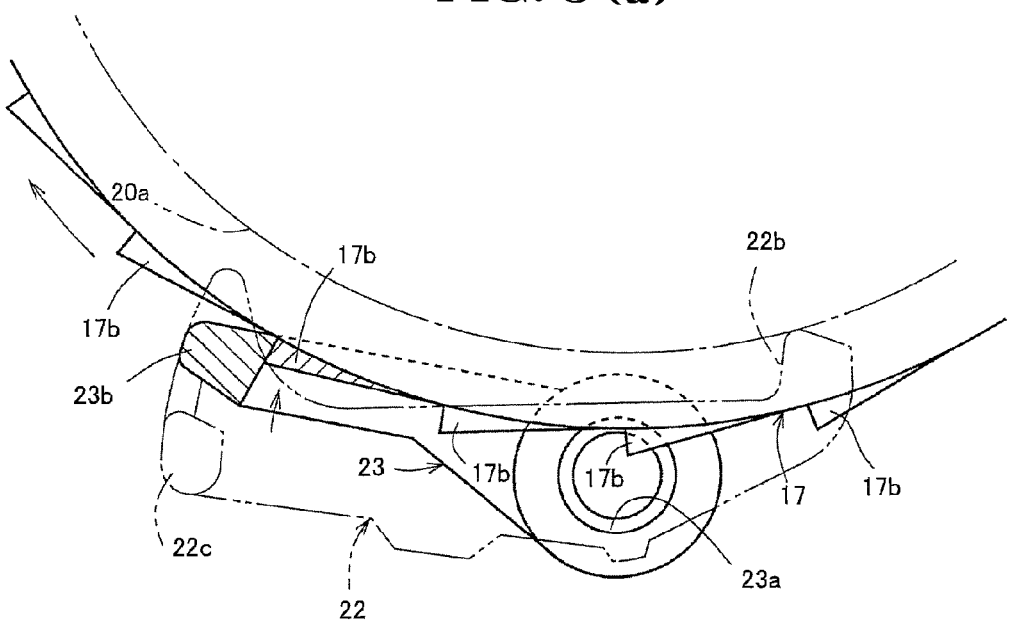

It is conceivable that the engaging claw 23b may be subjected to impact by contact with the tip of the ratchet tooth 17b of the ring gear 17 when being moved close to the ratchet tooth 17b of the ring gear 17 by the turn of the second lever 23, as illustrated in FIG. 9(a). In this case, when the engaging claw 23b comes into contact with the tip of the ratchet tooth 17b, the second lever 23 turns relative to the first lever 22 in the counterclockwise direction in FIG. 9(a) while compressing the second-lever bias spring 25. This absorbs and reduces the impact caused by the contact of the engaging claw 23b with the tip of the ratchet tooth 17b. When the engaging claw 23b comes out of contact with the tip of the ratchet tooth 17b by rotation of the ring gear 17, the second lever 23 is turned relative to the first lever 22 in the clockwise direction in FIG. 9(b) by the biasing force of the second-lever bias spring 25, as illustrated in FIG. 9(b). Thus, the engaging claw 23b normally engages with the ratchet tooth 17b to inhibit rotation of the ring gear 17 in the seat belt withdrawing direction.

When the seat belt 4 is released from the state withdrawn by a predetermined length in FIGS. 7 and 8, for example, in order to unfasten the seat belt 4, the spool 9 is rotated clockwise in FIG. 7 (counterclockwise in FIG. 8) by the biasing force of the spring mechanism 10 (the bearing cap 16 corotating with the spool 9 rotates clockwise in FIG. 7, and the rotation shaft 9a of the spool 9 rotates counterclockwise in FIG. 8), so that the seat belt 4 is retracted by the spool 9. By the rotation of the spool 9, the cam plate 20 is decelerated and rotated in the counterclockwise direction in FIG. 7 opposite the rotating direction of the spool 9, similarly to the above-described manner. At this time, the cam follower 22b of the first lever 22 is in contact with the first cam portion 20a of the cam plate 20, and the first and second levers 22 and 23 are retained at the position illustrated in FIGS. 7 and 8.

Immediately before the seat belt 4 is fully retracted, the second cam portion 20h of the cam plate 20 opposes the cam follower 22b of the first lever 22. Then, the first lever 22 is turned clockwise in FIG. 7 by the biasing force of the first-lever bias spring 24, and the cam follower 22b of the first lever 22 comes into contact with the second cam portion 20b of the cam plate 20, as illustrated in FIG. 5. Thus, as illustrated in FIGS. 5 and 6, the actuator pressing portion 22c of the first lever 22 comes into contact with the actuator 13b of the vehicle sensor 13, and presses the actuator 13b to a non-operation position. Therefore, the function of the vehicle sensor 13 is cancelled.

When the first lever 22 turns, the second lever 23 turns together with the first lever 22 in the same direction. Thus, as illustrated in FIG. 6, the engaging claw 23b of the second lever 23 separates from the ratchet tooth 17b of the ring gear 17, and the ring gear 17 is allowed to rotate in both the seat belt withdrawing direction and the seat belt retracting direction. Therefore, the function of the webbing sensor 12 is cancelled.

When the seat belt 4 is fully retracted by the spool 9, rotation of the spool 9 stops, retraction of the seat belt 4 by the spool 9 is finished, and the seat belt retractor 3 is brought into a non-operation state illustrated in FIGS. 5 and 6. At this time, the function of the webbing sensor 12 is cancelled, and therefore, an end-lock is prevented from occurring when the seat belt 4 is fully retracted.

In this way, the first and second levers 22 and 23 constitute one vehicle-sensor-function and webbing-sensor-function cancel control member 26 in the seat belt retractor 3 of the embodiment. Further, the retainer 15, the ring gear 17, the eccentric gear 19, the cam plate 20, and the vehicle-sensor-function and webbing-sensor-function cancel control member 26 constitute a vehicle-sensor-function and webbing-sensor-function cancel control mechanism that controls cancellation of the function of the vehicle sensor 13 and the function of the webbing sensor 12.

According to the seat belt retractor 3 of the embodiment, both the function of the vehicle sensor 13 and the function of the webbing sensor 12 can be performed. Further, the retainer 15, the ring gear 17, the eccentric gear 19, the cam plate 20, and the vehicle-sensor-function and webbing-sensor-function cancel control member 26 control cancellation of the function of the vehicle sensor 13 and the function of the webbing sensor 12. Therefore, with a simple structure using the single vehicle-sensor-function and webbing-sensor-function cancel control member 26, cancellation of the function of the vehicle sensor 13 and the function of the webbing sensor 12 can be controlled easily.

In particular, when the spool 9 at least fully retracts the seat belt 4, the function of the vehicle sensor 13 and the function of the webbing sensor 12 are cancelled. By such cancellation of the function of the vehicle sensor 13, the vehicle sensor 13 is disabled to operate. Thus, it is possible to prevent abnormal noise from occurring from the vehicle sensor 13 in the seat belt retractor 3 that is not used during vehicle running (that is, the seat belt retractor 3 in the seat belt device 1 mounted on the vehicle seat 2 on which no occupant is sitting). When the function of the webbing sensor 12 is cancelled, as described above, the webbing sensor 12 is substantially disabled to operate. Thus, it is possible to prevent an end-lock from being caused by sudden operation of the webbing sensor 12 when the seat belt 4 is at least fully retracted by the spool 9 and the spool 9 is stopped.

Since the retainer 15, the ring gear 17, the eccentric gear 19, and the cam plate 20 can be the same as those used in the conventional seat belt retractors, the vehicle-sensor-function and webbing-sensor-function cancel control mechanism can be formed without any need for any great design change, and the increase in the number of components can be suppressed. As a result, even when cancellation of the function of the vehicle sensor and the function of the webbing sensor can be controlled, the seat belt retractor 3 can be made compact.

In this way, according to the seat belt retractor 3 of the embodiment, the function of the vehicle sensor 13 and the function of the webbing sensor 12 can be performed and the functions can be cancelled on a predetermined condition, with a simple structure and a small number of components.

Since the seat bell device 1 of the embodiment can effectively prevent the occurrence of abnormal noise and the occurrence of an end-lock in the seat belt retractor 3, operability of the seat belt 4 is enhanced, the occupant can smoothly and stably wear the seat belt 4, and comfort during vehicle running can be improved.

The present invention is not limited to the above-described embodiment, and various design changes are possible. For example, while the vehicle-sensor-function and webbing-sensor-function cancel control member 26 is formed by two levers, that is, the first and second levers 22 and 23 that are turnable relative to each other in the above-described embodiment, the vehicle-sensor-function and webbing-sensor-function cancel control member 26 can be formed by only one first lever 22. In this case, the engaging claw 23b of the second lever 23 is provided integrally with the first lever 22 as a corresponding engaging claw. When the engaging claw provided in the first lever 22 comes into contact with the tip of the ratchet tooth 17b of the ring gear 17, the first-lever bias spring 24 is compressed to absorb and reduce impact. However, the biasing force of the first-lever bias spring 24 needs to be set to be more than the biasing force of the second-lever bias spring 25 because the cam follower 22b needs to follow the first and second cam portions 20a and 20b. Therefore, to more effectively absorb and reduce the above-described impact, the vehicle-sensor-function and webbing-sensor-function cancel control member 26 is preferably formed by two levers, that is, the first and second levers 22 and 23, as in the above-described embodiment.

While one cam plate 20 is commonly used to control turns of the first and second levers 22 and 23 in the above-described embodiment, two cam plates can be separately provided corresponding to the first and second levers 22 and 23. In short, various modifications of the present invention are possible within the range described in the claims.

The seat belt retractor and the seat belt device of the present invention are suitably applicable to a seat belt retractor including at least a vehicle sensor for inhibiting withdrawal of a seat belt in case of an emergency and a webbing sensor for inhibiting withdrawal of the seat belt when the seat belt is rapidly withdrawn, and to a seat belt device using the seat belt retractor.

The priority application, Japanese Patent Application 117185/2011, filed May 25, 2011 including the specification, drawings, claims and abstract, is incorporated herein by reference in its entirety.

What is claimed is:

1. A seat belt retractor including at least a spool that retracts a seat belt for restraining an occupant, the seat belt retractor comprising:
a vehicle sensor having a function of operating to inhibit rotation of the spool in a seat belt withdrawing direction in case of an emergency when a deceleration higher than a normal deceleration is applied to a vehicle;
a webbing sensor having a function of operating to inhibit rotation of the spool in the seat belt withdrawing direction when the seat belt is rapidly withdrawn at a speed higher than a normal withdrawing speed; and
a vehicle-sensor-function and webbing-sensor-function cancel control mechanism that controls cancellation of the function of the vehicle sensor and the function of the webbing sensor, wherein the vehicle-sensor-function and webbing-sensor-function cancel control mechanism includes:
a control cam member that rotates with rotation of the spool to control operation of the vehicle-sensor-function and webbing-sensor-function cancel control mechanism;
a first lever operationally controlled by the control cam member to cancel the function of the vehicle sensor; and
a second lever that is coaxially connected to the first lever and movable relative to the first lever, wherein the second lever is operationally controlled by the cam member to cancel the function of the webbing sensor.

2. The seat belt retractor according to claim 1, wherein when the function of the vehicle sensor and the function of the webbing sensor are cancelled, an actuator pressing portion of the first lever contacts an actuator of the vehicle sensor and presses the actuator to a non-operation position.

3. The seat belt retractor according to claim 1, wherein the vehicle-sensor-function and webbing-sensor-function cancel control mechanism controls the vehicle sensor and the webbing sensor so that the function of the vehicle sensor and the webbing sensor are cancelled when the spool at least fully retracts the seat belt.

4. A seat belt retractor including at least a spool that retracts a seat belt for restraining an occupant, the seat belt retractor comprising:
a vehicle sensor having a function of operating to inhibit rotation of the spool in a seat belt withdrawing direction in case of an emergency when a deceleration higher than a normal deceleration is applied to a vehicle;
a webbing sensor having a function of operating to inhibit rotation of the spool in the seat belt withdrawing direction when the seat belt is rapidly withdrawn at a speed higher than a normal withdrawing speed; and
a vehicle-sensor-function and webbing-sensor-function cancel control mechanism that controls cancellation of the function of the vehicle sensor and the function of the webbing sensor;
wherein the vehicle-sensor-function and webbing-sensor-function cancel control mechanism controls the vehicle sensor and the webbing sensor so that the function of the vehicle sensor and the function of the webbing sensor are cancelled when the spool at least fully retracts the seat belt at the time the seat belt is not worn;
wherein the vehicle-sensor-function and webbing-sensor-function cancel control mechanism includes:
a vehicle-sensor-function and webbing-sensor-function cancel control member that controls cancellation of the function of the vehicle sensor and the function of the webbing sensor; and
a control cam member that rotates with rotation of the spool to control operation of the vehicle-sensor-function and webbing-sensor-function cancel control member,
wherein the vehicle-sensor-function and webbing-sensor-function cancel control member is a control lever whose operation is controlled by the control cam member, and
wherein the control lever includes a first lever that is configured to cancel the function of the vehicle sensor, and a second lever that is connected to the first lever to be movable relative to the first lever and that is configured to cancel the function of the webbing sensor.

5. The seat belt retractor according to claim 4, wherein the second lever is coaxially connected to the first lever to be movable relative to the first lever.

6. The seat belt retractor according to claim 4, wherein when the function of the vehicle sensor and the function of the webbing sensor are cancelled, an actuator pressing portion of the first lever contacts an actuator of the vehicle sensor and presses the actuator to a non-operation position.

7. A seat belt device comprising at least:
a seat belt that restrains an occupant;
a seat belt retractor that withdrawably retracts the seat belt and that operates to inhibit withdrawal of the seat belt in case of an emergency;
a tongue slidably supported by the seat belt withdrawn from the seat belt retractor; and
a buckle provided in a vehicle body or a vehicle seat to detachably catch the tongue, wherein the seat belt retractor includes at least a spool that retracts the seat belt for restraining the occupant, the seat belt retractor comprising:
  a vehicle sensor having a function of operating to inhibit rotation of the spool in a seat belt withdrawing direction in case of an emergency when a deceleration higher than a normal deceleration is applied to a vehicle;
  a webbing sensor having a function of operating to inhibit rotation of the spool in the seat belt withdrawing direction when the seat belt is rapidly withdrawn at a speed higher than a normal withdrawing speed; and
  a vehicle-sensor-function and webbing-sensor-function cancel control mechanism that controls cancellation of the function of the vehicle sensor and the function of the webbing sensor;
  wherein the vehicle-sensor-function and webbing-sensor-function cancel control mechanism includes:
    a vehicle-sensor-function and webbing-sensor-function cancel control member that controls cancellation of the function of the vehicle sensor and the function of the webbing sensor; and
    a control cam member that rotates with rotation of the spool to control operation of the vehicle-sensor-function and webbing-sensor-function cancel control member,
  wherein the vehicle-sensor-function and webbing-sensor-function cancel control member is a control lever whose operation is controlled by the control cam member, and
  wherein the control lever includes a first lever that is configured to cancel the function of the vehicle sensor, and a second lever that is coaxially connected to the first lever to be movable relative to the first lever and is configured to cancel the function of the webbing sensor.

8. The seat belt device according to claim 7, wherein when the function of the vehicle sensor and the function of the webbing sensor are cancelled, an actuator pressing portion of the first lever contacts an actuator of the vehicle sensor and presses the actuator to a non-operation position.

* * * * *